(12) United States Patent
Dalmatov et al.

(10) Patent No.: US 11,327,948 B1
(45) Date of Patent: May 10, 2022

(54) MANAGING DEDUPLICATION OF DATA IN STORAGE SYSTEMS

(71) Applicant: EMC Corporation, Hopkinton, MA (US)

(72) Inventors: Nickolay Dalmatov, St. Petersburg (RU); Richard P. Ruef, Santa Cruz, CA (US); Kurt William Everson, Missouri City, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 739 days.

(21) Appl. No.: 15/198,425

(22) Filed: Jun. 30, 2016

(51) Int. Cl.
*G06F 16/23* (2019.01)
*G06F 16/215* (2019.01)
*G06F 16/22* (2019.01)

(52) U.S. Cl.
CPC ........ *G06F 16/2365* (2019.01); *G06F 16/215* (2019.01); *G06F 16/2282* (2019.01)

(58) Field of Classification Search
None
See application file for complete search history.

(56) References Cited

U.S. PATENT DOCUMENTS

| | | | | |
|---|---|---|---|---|
| 8,140,821 | B1 * | 3/2012 | Raizen | G06F 11/1448 707/637 |
| 8,468,320 | B1 * | 6/2013 | Stringham | G06F 3/0608 707/610 |
| 8,805,796 | B1 * | 8/2014 | Hu | G06F 3/0608 707/692 |
| 8,930,306 | B1 * | 1/2015 | Ngo | G06F 17/30194 707/610 |
| 9,846,718 | B1 * | 12/2017 | Ruef | G06F 17/30371 |
| 2011/0246741 | A1 * | 10/2011 | Raymond | G06F 17/30159 711/170 |
| 2011/0320507 | A1 * | 12/2011 | Peleg | G06F 3/0608 707/822 |
| 2014/0279951 | A1 * | 9/2014 | Akirav | G06F 17/30156 707/692 |
| 2014/0279953 | A1 * | 9/2014 | Aronovich | G06F 17/30159 707/692 |
| 2015/0019506 | A1 * | 1/2015 | Aronovich | G06F 17/30156 707/692 |
| 2017/0083581 | A1 * | 3/2017 | Kozlovsky | G06F 17/30489 |
| 2017/0329527 | A1 * | 11/2017 | Lakshman | G06F 3/0608 |

* cited by examiner

*Primary Examiner* — James Trujillo
*Assistant Examiner* — Kurt A Mueller
(74) *Attorney, Agent, or Firm* — Krishnendu Gupta; Deepika Bhayana; Dorothy Wu Chiang

(57) ABSTRACT

A method is used in managing deduplication of data in storage systems. A candidate data object is identified for deduplicating a data object by evaluating digests stored in a current digest segment to determine whether another digest matching a digest associated with the data block is stored in the current digest segment. The current digest segment includes a set of digests associated with a set of data blocks previously received for deduplication. Based on the evaluation, a deduplicating technique is applied to the data object. The current digest segment is stored in an index table. A previous digest segment associated with a digest stored in the index table matches the digest associated with the data block is replaced by the current digest segment.

20 Claims, 7 Drawing Sheets

MANAGING DEDUPLICATION OF DATA IN STORAGE SYSTEMS

CROSS REFERENCE TO RELATED APPLICATIONS

This application is related to co-pending U.S. patent application Ser. No. 15/198,334 entitled MANAGING DEDUPLICATION OF DATA IN STORAGE SYSTEMS filed on Jun. 30, 2016, which is incorporated herein by reference and co-pending U.S. patent application Ser. No. 15/198,477 entitled MANAGING DEDUPLICATION OF DATA IN STORAGE SYSTEMS filed on Jun. 30, 2016, which is incorporated herein by reference.

BACKGROUND

Technical Field

This application relates to managing deduplication of data in storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data deduplication (also referred to simply as "deduplication") is a space-saving technology intended to eliminate redundant (duplicate) data (such as, files) on a data storage system. By saving only one instance of a file, disk space can be significantly reduced. For example, if a file of size 10 megabytes (MB) is stored in ten folders of each employee in an organization that has ten employees. Thus, 100 megabytes (MB) of the disk space is consumed to maintain the same file of size 10 megabytes (MB). Deduplication ensures that only one complete copy is saved to a disk. Subsequent copies of the file are only saved as references that point to the saved copy, such that end-users still see their own files in their respective folders. Similarly, a storage system may retain 200 e-mails, each with an attachment of size 1 megabyte (MB). With deduplication, the disk space needed to store each attachment of size 1 megabyte (MB) is reduced to just 1 megabyte (MB) from 200 megabyte (MB) because deduplication only stores one copy of the attachment.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file does not constitute an entirely new file.

While deduplication systems have helped make data management much easier, they also come with a number of challenges.

SUMMARY OF THE INVENTION

A method is used in managing deduplication of data in storage systems. A candidate data object is identified for deduplicating a data object by evaluating digests stored in a current digest segment to determine whether another digest matching a digest associated with the data block is stored in the current digest segment. The current digest segment includes a set of digests associated with a set of data blocks previously received for deduplication. Based on the evaluation, a deduplicating technique is applied to the data object. The current digest segment is stored in an index table. A previous digest segment associated with a digest stored in the index table matches the digest associated with the data block is replaced by the current digest segment.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
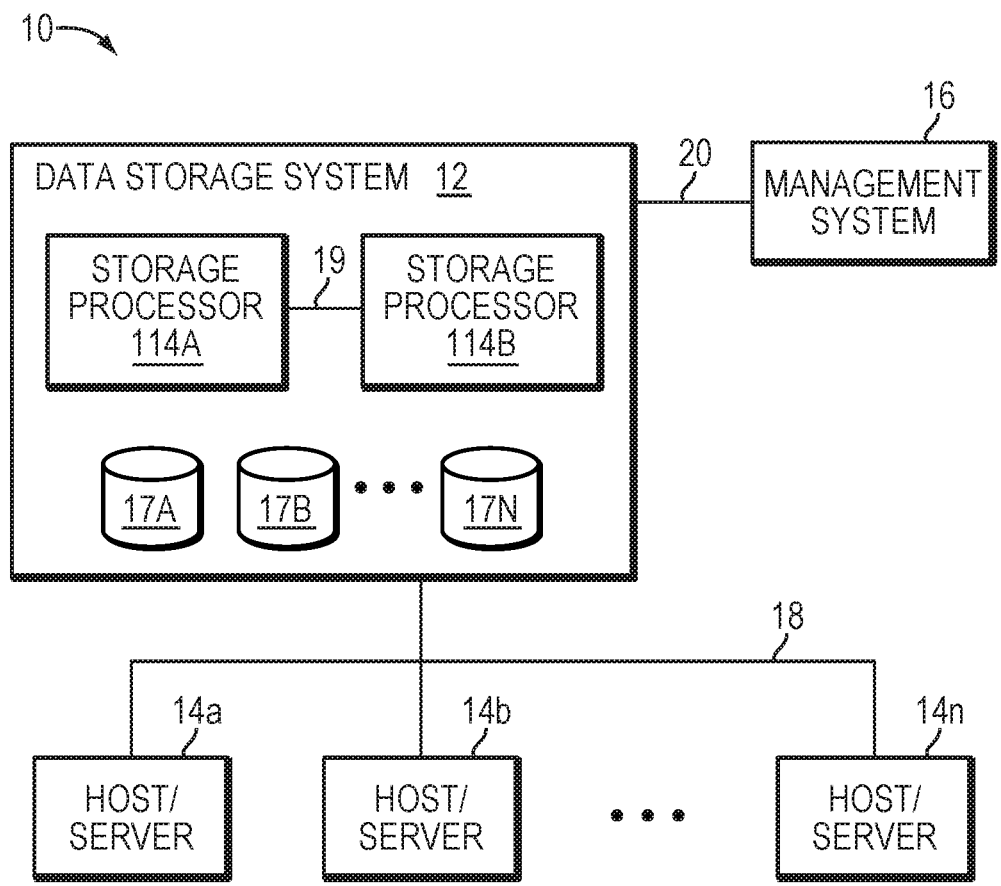
FIGS. 1 and 2 are examples of an embodiment of a computer system that may utilize the techniques described herein.

Described below is a technique for use in managing deduplication of data in storage systems, which technique may be used to provide, among other things, determining a digest for a data object received for deduplication, identifying a candidate data object for deduplicating the data object, where a digest associated with the candidate data object matches the digest associated with the data object, and maintaining the digest in a digest segment based on identification of the candidate data object, where the digest segment includes a set of digests associated with a set of data blocks identified for deduplication in an ordered arrangement.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set.

Generally, during iteration of data blocks of a deduplication domain, digest for each data block is computed and compared with digests stored in an index table. If a matching digest for a data block is found in an index table, contents of data blocks are compared to verify that the data blocks are duplicates of each other, and the data block is deduplicated to an identical data block associated with the matching digest found in the index table by updating address mapping information of the deduplicated data block to point to the identical data block found using the index table. Further, if no matching digest for a data block is found in an index table, the digest for the data block is added to the index table. Thus, deduplication maps data blocks that contain identical information to a single copy of the data thereby consolidating I/O operations directed to the identical data blocks to the single copy of the data.

Generally, off-line (also referred to herein as "post-processing") data deduplication requires that data blocks in a storage extent be iterated, identified and processed for deduplication after the data blocks have been written to storage devices. Further, in-line data deduplication requires that data blocks in a storage extent be identified and processed for deduplication before or as the data blocks are being written to storage devices. A set of storage extents that may be deduplicated together form a deduplication domain. During the process of deduplication, generally, an index table of unique digests is created from data contents of the blocks that are iterated through. Generally, a digest associated with a data block is smaller in size than the data block. For example, a digest for a data block of size 8 kilobytes (KB) may be of a size which may range from 8 bytes to 32 bytes. Typically, comparing digests of data blocks is faster than comparing contents of the data blocks because comparing contents of the data blocks include reading contents of the data blocks from a storage device. As a result, comparing digests of data blocks provides a fast and efficient way of determining identical data blocks if the digest of the data blocks matches with each other.

Generally, when a data block is evaluated for deduplication in a storage system, a determination is made as to whether a digest identical to the digest of the data block exists in an index table. If such digest does not exist in the index table, it may indicate that the data block is unique and is not identical to any other data block in the storage system. However, if such digest do exist in the index table, contents of a data block associated with the matching digest are read from a storage device and compared with contents of the data block. If contents of the data blocks matches, the data block is deduplicated to the data block with the matching digest. However, if contents of the data blocks do not match with each other, the data blocks are found to be unique and not identical to each other. Because a data block is mapped to a digest which is much smaller in size compared to the size of the data block, it is likely that digests for two data blocks may match with each other even though contents of the two data blocks are not identical to each other. Such a situation is referred to as a digest collision. Thus, a digest collision indicates a situation in which two data blocks have same digest but different content. A digest collision may result into a read operation required for reading contents of a data block from a storage device thereby consuming system resources.

Generally, when data blocks are processed for data deduplication, digests of different data blocks that are stored on storage devices ("physical data blocks") are evaluated which requires such digests to be indexed in such a way that each digest refer to respective location of such physical data blocks. Conventionally, an index table includes digest and respective physical location (e.g., block address, offset) of a data block and organized on a storage device. In such a conventional system, an access to a digest stored in an index table results into a disk I/O which encompasses I/O operations on a physical storage device. In such a conventional system, the amount of time required for a storage system to process a request to find a matching digest in an index table and then retrieve the required digest from a storage device is significantly large (also referred to herein as "access time"). Further, in such a conventional system, generally digests generated for data blocks that are stored in an index table are random in nature thereby generating random accesses to the index table. Further, in such a conventional system, as the number of data blocks increases in a storage system, the size of an index table increases in order to accommodate digests of the data blocks. Thus, in such a conventional system, a storage system is unable to organize an index table including a large number of digests in random access memory and thus is stored on a persistent storage. In such a conventional system, random accesses to digests of an index table organized on a persistent storage device (e.g., hard disk drive) decreases the speed at which data blocks are processed for deduplication in a storage system because each access to a digest in the index table requires a separate access to the index table where each of such accesses is random in nature. Further, in such a conventional system, the amount of time required to access data on a persistent storage device is slower than the amount of time required to access data on random access memory.

By contrast, in at least some implementations in accordance with the technique as described herein, reference of locality for access to data blocks is used to group a set of digests together in a digest segment where such digest segment is stored on a storage medium which has a faster access time compared to a persistent storage device for applying a deduplicating technique. In at least one embodiment of the current technique, temporal and spatial locality of accesses by users is used for applying deduplicating techniques as such locality of access is generally a normal access pattern in a storage system and has a high probability of repeating itself over a period of time. Further, in at least one embodiment of the current technique, a sampling criteria is used to reduce the number of digests that are indexed and stored in an index table in such a way that it may indicate a high probability of finding a matching digest in the index table thereby providing a high deduplication ratio.

In at least one embodiment of the current technique, data blocks are grouped into a set of segments and stored in such segments in the same order such data blocks are received for applying deduplicating technique in order to preserve temporal locality of such data blocks. Further, in at least one embodiment of the current technique, a digest is computed for each data block received for processing for deduplicating where such digest is checked as to whether such data block is a unique data block and has not been stored previously in a storage system. Upon determining that a data block is a unique data block indicating that such data block has not been stored previously in a storage device, contents of such data block is stored in a data segment. However, upon determining that a data block is not a unique data block indicating that such data block has been stored previously in a storage device, a reference to the existed data block previously stored on the storage device is provided to a user and the data block is shared by using deduplicating techniques.

In at least one embodiment of the current technique, when a data block that is processed for deduplication and checked whether such data block is a unique data block, a digest for the data block is computed and searched in a rapid lookup digest segment which indicates the current digest segment that has been loaded in a fast access storage medium (e.g., cache, random access memory, flash storage device). If a digest entry matching the digest of the data block is not found in the rapid lookup digest segment, a matching digest entry is searched in an index table. Upon finding a matching digest entry in the index table, the entire digest segment associated with the matching digest entry is loaded in a fast access storage medium and is stored as the current rapid lookup digest segment because if one digest in the digest segment matches the digest of the data block received for deduplication, there is a high probability that matching digests for subsequent data blocks received for deduplication would be found in the same digest segment as well thereby avoiding searching for matching digests in an index table.

Further, in at least one embodiment of the current technique, a digest segment associated with a matching digest entry retrieved from an index able and stored as the current rapid lookup digest segment is updated as and when new digest entries are added to the current rapid lookup digest segment in such a way that the index table is updated at a later time with the updated current digest segment in order to maintain temporal locality of data blocks and decrease defragmentation.

In at least some implementations in accordance with the current technique as described herein, the use of the managing deduplication of data in storage systems technique can provide one or more of the following advantages: lowering costs by improving deduplication efficiency, improving memory utilization by reducing the number of read operations on a persistent storage device, improving deduplication performance by using a rapid lookup digest segment, and reducing the amount of storage resources required for data deduplication with storing digest information based on a sampling criteria and processing incoming data blocks for deduplication at significantly less amount of time.

It should be noted that the terms "data storage system", "storage system", disk array", and "storage array" have been used interchangeably in this specification.

FIG. 1 depicts an example embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the system 10. In one embodiment, the communication medium 2 may be a LAN connection and the communication medium 18 may be an iSCSI, Fibre Channel, Serial Attached SCSI, or Fibre Channel over Ethernet connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage system s 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 17a-17n. Unless noted otherwise, data storage devices may be used interchangeably herein to refer to hard disk drive, solid state drives, and/or other known storage devices. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two storage processors or compute processing units. Techniques herein may be more generally use in connection with any one or more data storage system each including a different number of storage processors than as illustrated herein. The data storage system 12 may be a data storage array, such as a VNX™ or VNXe™ data storage array by EMC Corporation of Hopkinton, Mass., including a plurality of data storage devices 17a-17n and two storage processors 114A, 114B. The storage processors 114A, 114B may include a central processing unit (CPU) and memory and ports (not shown) for communicating with one or more physical or virtual hosts 14A-14N. The storage processor may be communicatively coupled via a communication medium such as storage processor bus 19. The storage processor units may be included in the data storage system 12 for processing requests and commands. In connection with performing techniques herein, an embodiment of the data storage system may include multiple storage processors including more than two storage processors as described. The VNX™ or VNXe™ data storage system mentioned above may include two storage processors 114A, 114B for performing processing in connection with servicing requests. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts, other data storage systems, management system, and other components connected thereto. Each of the SPs may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two SPs. Upon the occurrence of failure of one the SPs, the other remaining SP may handle all processing typically performed by both SPs.

Figure 2:
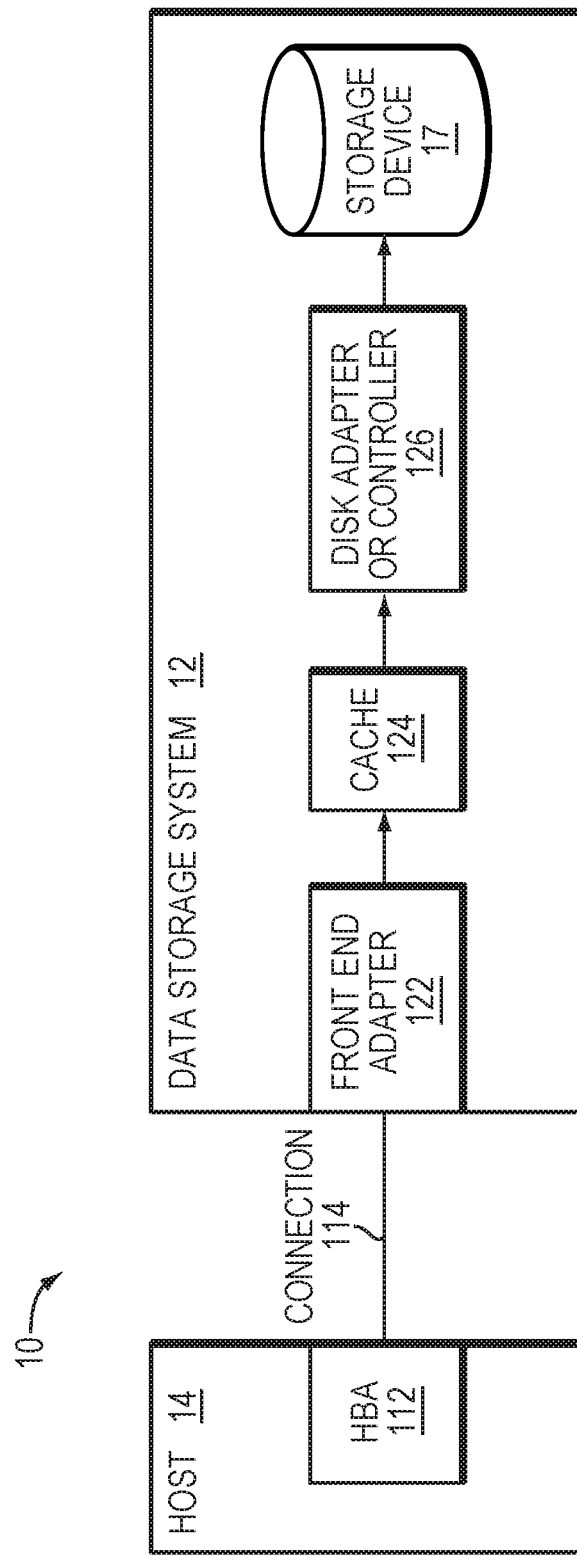

With reference to FIG. 2, shown is an example 10 illustrating components of a system that may be used in an embodiment in accordance with techniques herein. The example 10 includes a simplified view of components of a system as described above. The example 10 includes a host 14 with an Host Bus Adapter ("HBA") 112. The host 14 communicates with data storage system 12 over connection 114. Connection 114 may be, for example, a network connection between the HBA 112 and a front end adapter 122 of the data storage system 12. As described above, a front end adapter 122 may be, for example, a Fibre Channel Adapter ("FA") or other adapter which facilitates host communication. The data storage system 12 also includes a cache 124, a Disk Adapter ("DA") or storage controller 126 and one or more physical storage devices 17 (e.g., rotating disks or solid state devices (SSDs) such as a flash drive).

Components of the data storage system 12, such as a Host Adapter ("HA"), which may communicate with a host may also be referred to as front end components. Within the data storage system 12, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the HAs, and the cache memory 124. An embodiment, for example, may use one or more internal busses and/or communication modules. For example, the cache memory 124 may be used to facilitate data transfers and other communications between the DAs and HAs in a data storage system.

Data storage system 12 may include a plurality of storage devices such as disk devices or volumes included in an arrangement consisting of n rows of disks or more generally, data storage devices, 17a-17n. In this arrangement, each row of disks may be connected to a disk adapter ("DA") or director responsible for the backend management of operations to and from a portion of the disks 17. In a data storage system such as by EMC Corporation, a backend DA may also be referred to as a disk controller. The DA may perform operations such as reading data from, and writing data to, the physical devices which are serviced by the DA.

The host 14 may issue an I/O operation to the data storage system over connection 114. For example, the host may issue a write operation to write data to a portion of storage device 17. In one embodiment, the data of the write operation may first be stored in cache 124 and then de-staged at a later point in time by DA 126 to the physical storage device 17. The foregoing host write operation is an example of an I/O operation of the type described above issued by the client. The single client I/O operation may result in actually writing data to one or more storage devices depending on how the device to which the I/O is directed is configured. When performing a read I/O operation received by the front end adapter 122, processing may first determine whether the data requested is already in cache 124 (thereby resulting in a cache hit or read hit). If the requested read data is in cache 124, the data is retrieved from cache 124 and returned to the host 14. Thus, a read resulting in a cache hit may be serviced without having to access the physical storage device 17 for the data. If the requested data is not in cache 124, the data is retrieved by the DA 126 from the storage device 128, stored in cache 124, and then returned by the front end adapter 122 to the host 14.

Examples of cache 124 may include but are not limited to a volatile, solid-state, cache memory system (e.g., a dynamic RAM cache memory system) and/or a non-volatile, solid-state, cache memory system (e.g., a flash-based, cache memory system).

As described in more detail in following paragraphs and figures and with reference to FIG. 1, each of the SPs 114A, 114B may have its own instance of a data model, such as an object model, that represents various logical and physical aspects of the data storage configuration. The data model may include objects representing physical and logical entities in the data storage system. For example, objects may exist in the model representing the data storage system configuration whereby the objects may represent physical entities such as the physical drives (PDs) and logical entities such as a RAID Group, a LUN, and the like.

Figure 3:
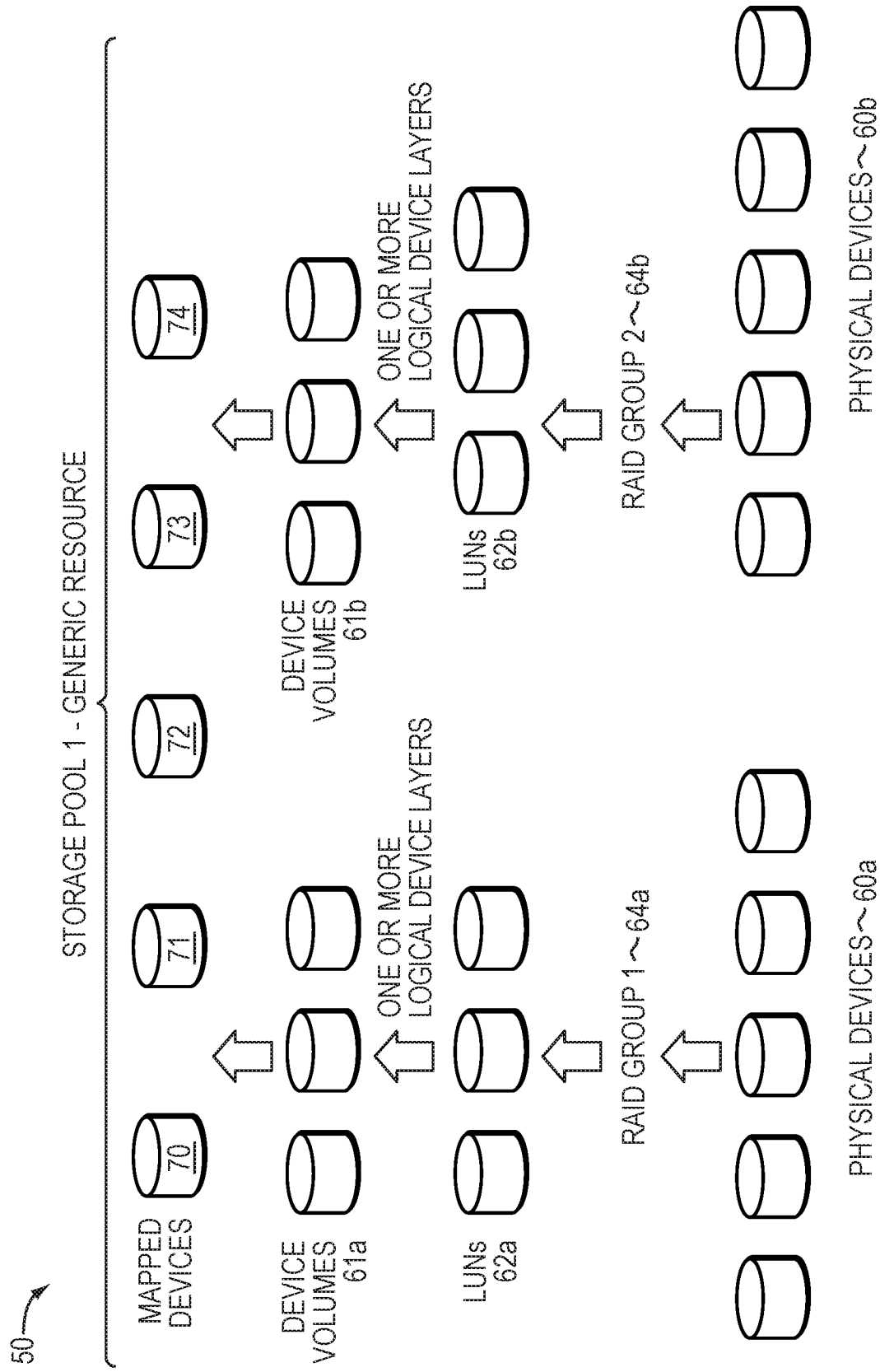
FIG. 3 is an example illustrating storage device layout.

Referring to FIG. 3, shown is an example representing how data storage system best practices may be used to form storage pools. The example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space. A disk may be a physical disk within the storage system. A LUN may be a logical unit number which is an identifier for a Logical Unit. Each slice of data may have a mapping to the location of the physical drive where it starts and ends.

Figure 4:
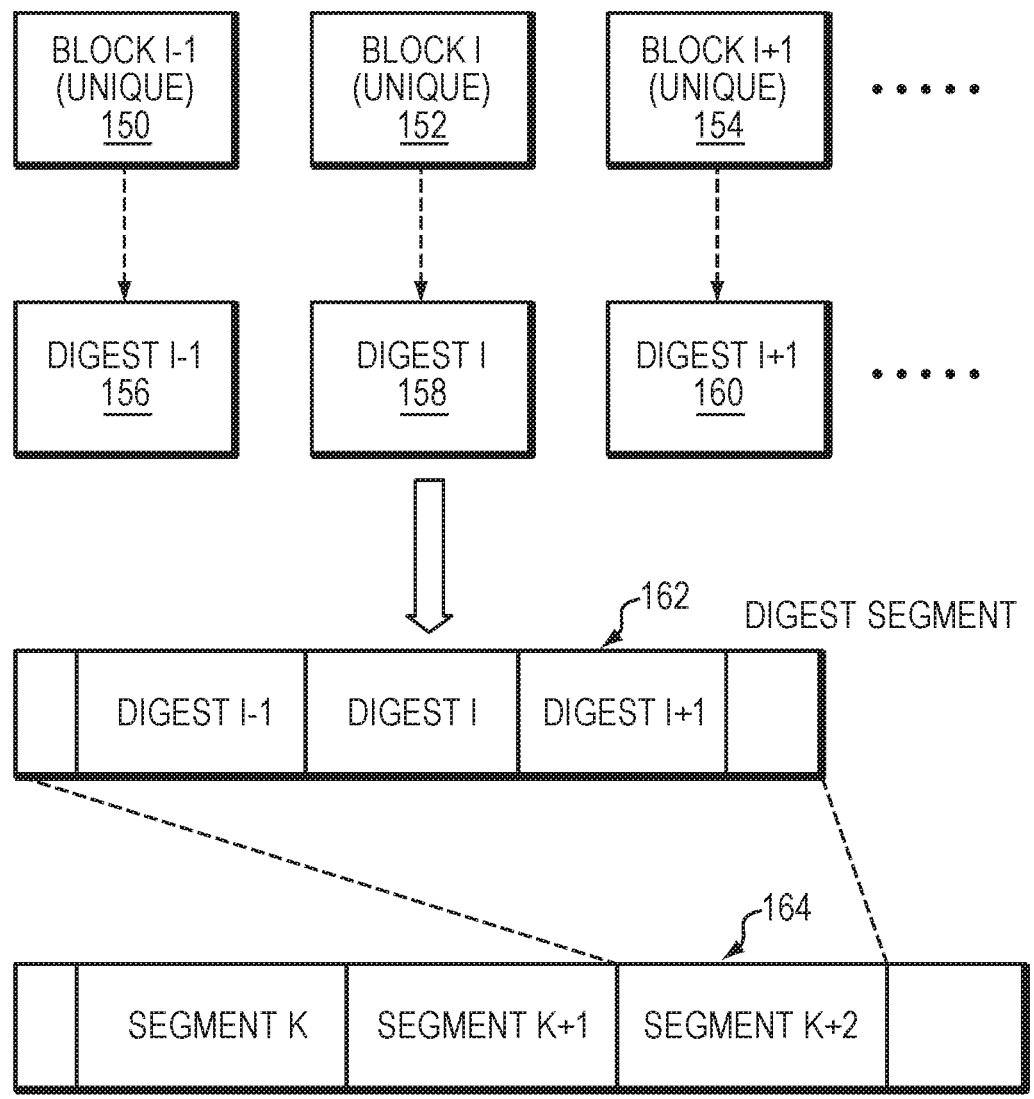
FIGS. 4-5 are diagrams illustrating in more detail components that may be used in connection with techniques herein.

Referring to FIG. 4, shown is more detailed representation of components that may be included in an embodiment using the techniques herein. With reference also to FIGS. 1-3, in at least one embodiment of the current technique, data blocks are received by a storage system and a digest for each such data blocks is computed. Such data blocks are stored in a set of data segments such that each data segment includes a set of data blocks. In at least one embodiment of the current technique, a data block identified as a unique data block is stored in a data segment in the same order in which the data block is received by a storage system for deduplication processing. In at least one embodiment of the current technique, a digest computed for a data block received by a storage system for deduplication processing is stored in a digest segment in the same order in which the data block is received by the storage system for deduplication processing. When a digest segment becomes full and can no longer store any more digest entries, the digest segment is stored on a persistent storage device by replacing a previously written digest segment. For example, as illustrated in FIG. 4, data blocks 150, 152, 154 are received by storage system 12 for deduplication processing and digests 156, 158, 160 for each of such data blocks are computed. Further, digests 156, 158, 160 are stored in digest segment 162.

Figure 5:
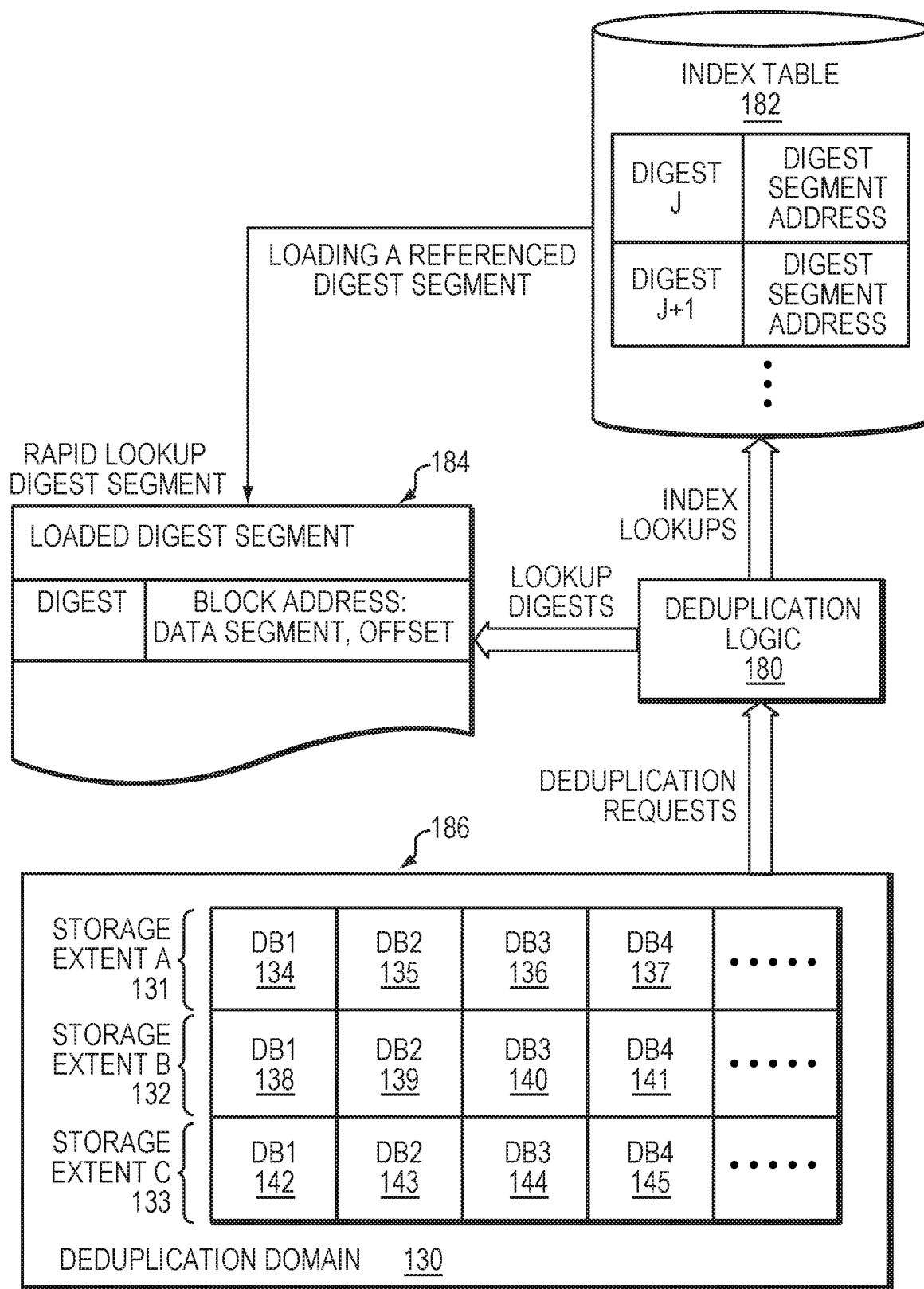

Referring to FIG. 5, shown is a more detailed representation of components that may be included in an embodiment using the techniques described herein. In a deduplication domain, each storage extent contains a set of data blocks. For example, in FIG. 5, storage extent A 131, storage extent B 132 and storage extent C 133 are part of the deduplication domain 130. Within data storage system 12, there may be multiple deduplication domains. Within a deduplication domain, a goal of a deduplication process is to maintain only a single copy of each unique set of data. Software or other logic executing the deduplication process examines data in the deduplication domain in fixed sized chunks and determines whether the data stored in a chunk is the same as the data stored in another chunk in the same deduplication domain. If so, an address map for the LUNs is manipulated so that respective address map entries for the chunks reference the same physical chunk of data, and then the chunks that currently hold the extra copies of the data are freed up as unused storage. The address map for the LUNs stores a mapping of logical block addresses to physical block addresses. In at least some embodiments of the current technique, the fixed sized chunk can be a data block. For example, in FIG. 5, storage extent A 131 includes data blocks 134-137, storage extent B 132 includes data blocks 138-141 and storage extent C 131 includes data blocks 142-145 and other data blocks (not shown).

In at least one embodiment of the current technique, deduplication logic 180 provides deduplication services in data storage system 12 by working in conjunction with other system components and/or logic of data storage system 12. A deduplication database (e.g. an index table) 182 is maintained for a deduplication domain. Deduplication logic 180 computes digests for data blocks that are processed for deduplication. A digest is created for each chunk of data (e.g., a data block) that is identified as a candidate for deduplication. Deduplication logic 180 detects potential duplicate copies of data and applies deduplicating techniques to deduplicate the data. The deduplication database is stored on one of the storage extents that include one or more LUNs. An index table 182 may also be maintained on a LUN located in the same pool as the deduplication domain 130.

In at least some implementations, an index table is a persistent hash-table of chunk-IDs keyed by the digest of the data stored in the chunk. The index table need not contain entries for every data chunk in the deduplication domain, but the effectiveness of deduplication is a function of the number of entries stored in the index table 182. The more entries in the index table, the more likely that duplicate blocks will be detected during deduplication processing. A sampling criterion may be used to determine which digests would be stored in the index table 182.

Generally, deduplication of data happens in two logically distinct operations: detection and remapping. The detection operation identifies blocks containing the same data. The remapping operation updates address maps that record physical locations of logical units of data so that a single block of data is shared by multiple LUNs or by multiple positions within the same LUN. Detection is accomplished by building a database (e.g., index table 182) that maintains a digest (e.g., SHA, checksum) for each block and a digest segment associated with such block. When two blocks have the same digest they have a sufficiently high probability of containing the same data to warrant a bit-for-bit comparison to confirm they are exact duplicates.

Further, in at least one embodiment of the current technique, in order to identify whether a data block received for deduplication is a unique data block that has not been stored previously on a storage device, rapid lookup digest segment 184 (also referred to herein as "current digest segment") is first searched to find a digest that matches a digest of a data block being processed for deduplication instead of searching for a matching digest in the index table 182. If a digest entry matching a digest of a data block received for deduplication is not found in the rapid lookup digest segment 184, a determination is made as to whether the digest of the data block matches a sampling criterion. If a digest of a data block matches the sampling criterion and the data block has not been previously stored on a storage device, the digest is added to the rapid lookup digest segment 184. However, if a digest of a data block does not match the sampling criterion, the data block is discarded and not stored in the index table 182. Further, if a digest of a data block matches the sampling criterion and matches a previously sampled data block indicating that a matching digest entry exists in the index table 182, a digest segment associated with the matching digest entry is loaded in a memory into the rapid lookup digest segment 184. Thus, in at least one embodiment of the current technique, a digest entry for which a matching digest is found is indexed if the digest entry has not been indexed previously. For digest entries that have been indexed previously, previous references to digests in a digest segment is replaced with new references to current digest entries in order to preserve temporal locality and decrease fragmentation.

In at least one embodiment of the current technique, a digest segment includes a set of digest entries and respective block address information for data blocks associated such digest entries. Each digest segment may be maintained as a least recently used circular list in which a digest entry which is no longer referenced may be reclaimed and storage space for such digest entry can be used to store a new digest entry. Further, in at least one embodiment of the current technique, the index table 182 includes a set of digest entries accessible by a hash and respective digest segment associated with each digest entries.

Figure 6:
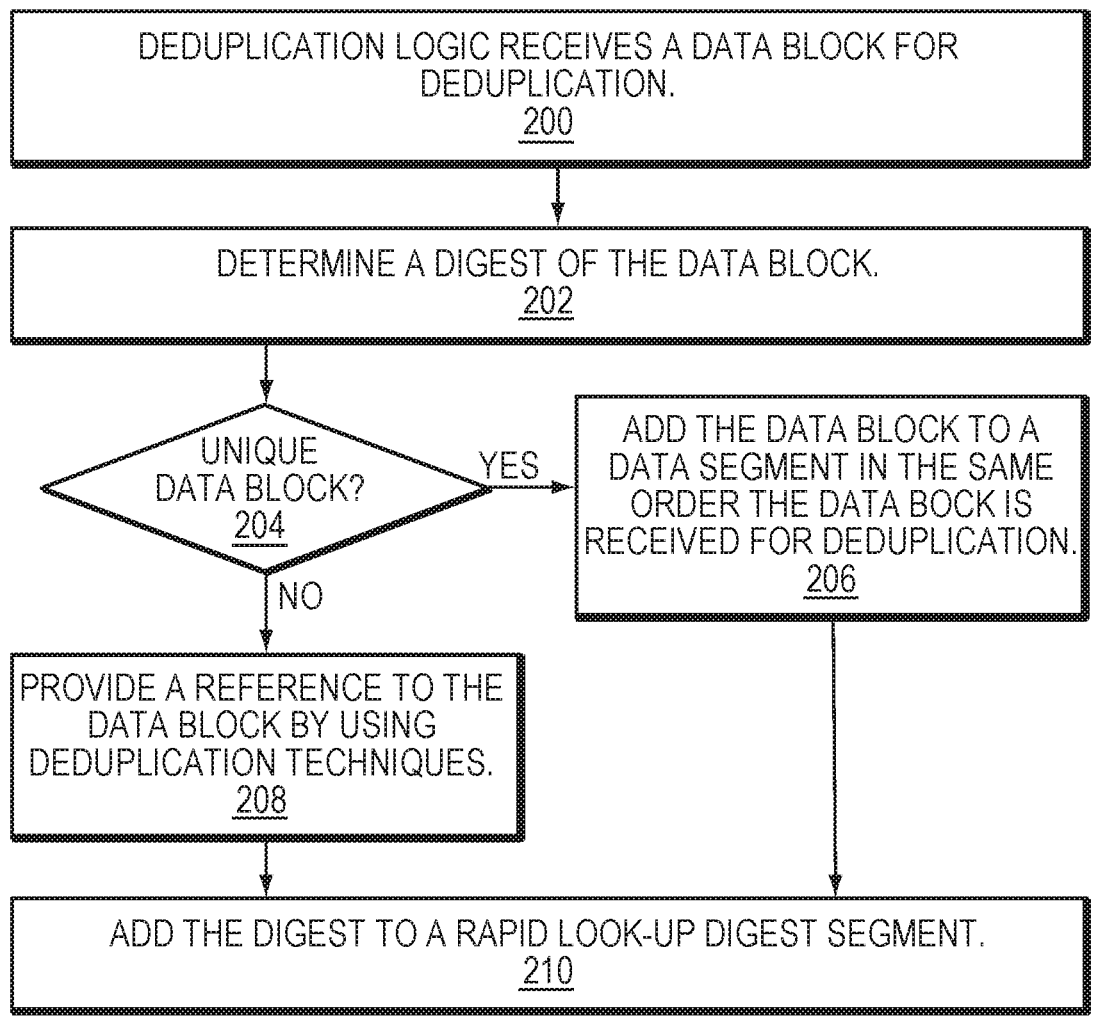
FIGS. 6-7 are flow diagrams illustrating processes that may be used in connection with techniques herein.

Referring to FIG. 6, shown is a more detailed flow diagram illustrating managing deduplication of data in storage systems. With reference also to FIGS. 1-5, in at least one embodiment of the current technique, deduplication logic 180 receives a data block for deduplication (Step 200). A digest for the data block is computed (step 202). A determination is made as to whether the data block is a unique data block (step 204). Upon determining that the data block is a unique data block, the data block is added to a data segment in the same order in which the data block is received for deduplication processing (step 206). However, upon determining that the data block is not a unique data block, a reference to the data block previously stored in the storage system 12 is provided to a user by using deduplication techniques (step 208). Further, the digest is added to a rapid lookup digest segment 184 (step 210).

Figure 7:
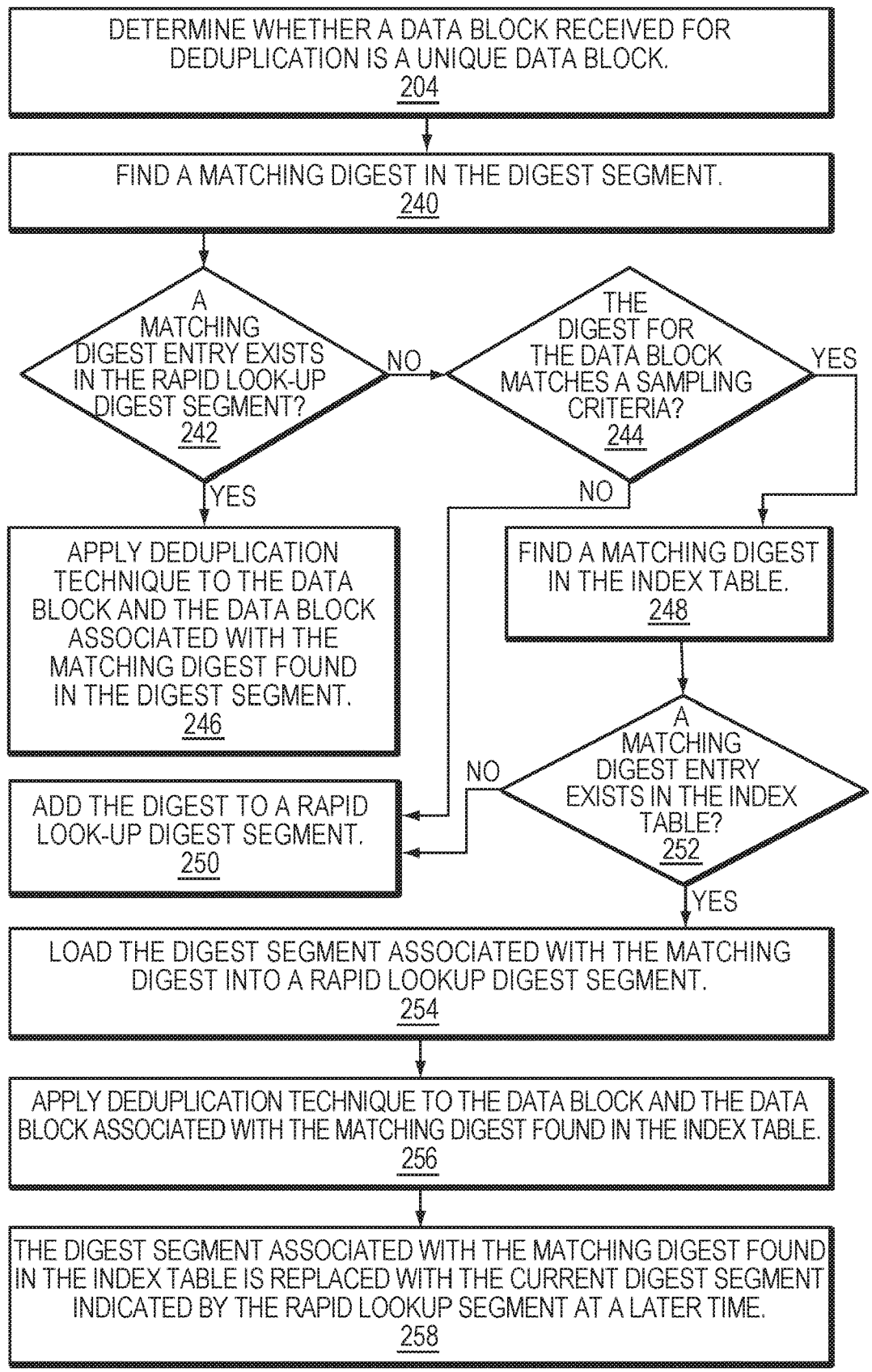

Referring to FIG. 7, shown is a more detailed flow diagram illustrating managing deduplication of data in storage systems. With reference also to FIGS. 1-6, in at least one embodiment of the current technique, a determination is made as to whether a data block received for deduplicating processing is a unique data block (step 204). The storage system 12 attempts to first find a digest entry in a rapid lookup digest segment 184 that matches a digest of the data block (also referred to herein as "matching digest entry") received for determining whether the data block is a unique data block (step 240). A determination is made as to whether a matching digest entry resides in the rapid lookup digest segment 184 (step 242). Upon determining that a matching digest entry is found in the rapid lookup digest segment 184, a deduplication technique is applied to the data block and a duplicate data block associated with the matching digest entry found in the rapid lookup digest segment 184 (step 246). However, upon determining that a matching digest entry is not found in the rapid lookup digest segment 184, a determination is made as to whether the digest for the data block matches or satisfies a sampling criterion (step 244). Upon determining that the digest for the data block does not match or satisfy a sampling criterion, the digest is added to the rapid lookup digest segment 184 (step 250). Upon determining that the digest for the data block match or satisfy a sampling criterion, deduplication logic 180 searches for a matching digest entry in the index table 180 (step 248). A determination is made as to whether a matching digest entry resides in the index table 180 (step 252). Upon determining that the matching digest entry does not reside in the index table 180, the digest is added to the rapid lookup digest segment 184 (step 250). However, upon determining that the matching digest entry does reside in the index table 180, a digest segment associated with the matching digest entry is retrieved and saved into the rapid lookup digest segment 184 (step 254). A deduplicating technique is applied to the data block and the duplicate data block associated with the matching digest entry (step 256). Further, in at least one embodiment of the current technique, a digest segment associated with a matching digest entry is replaced with the contents of the rapid lookup digest segment 184 at a later time (step 258).

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing deduplication of data in storage systems, the method comprising:
    searching a rapid lookup digest segment for a digest of a data block, the rapid lookup digest segment including a set of digests associated with a set of data blocks previously received for deduplication;
    adding the digest of the data block to the rapid lookup digest segment;
    identifying, in an index table, a digest segment with at least one digest in common with the set of digests of the rapid lookup digest segment, prior to addition of the digest of the data block; and
    overwriting the digest segment in the index table with the rapid lookup digest segment, the rapid lookup digest segment being associated with a data object for deduplication.

2. The method of claim 1, wherein a set of data objects resides on a storage extent comprising a set of LUNs, wherein each LUN of the set of LUNs is a logical representation of a subset of a physical disk storage.

3. The method of claim 1, wherein the data object includes the data block, wherein the data block is a fixed size chunk of physical disk storage.

4. The method of claim 1, wherein the digest is based on contents of the data object that uniquely identifies the data object.

5. The method of claim 1, wherein an index table comprises a set of index entries, wherein each index entry of the set of index entries is associated with a digest of a data object that satisfies a sampling criterion, wherein each index entry of the set of index entries includes a digest of the data object and information regarding a digest segment associated with the data object.

6. The method of claim 1, wherein the data object is deduplicated upon receiving a request to write data to the data object.

7. The method of claim 1, wherein the rapid lookup digest segment is stored on a fast access memory.

8. The method of claim 1, wherein the set of digests in the rapid lookup digest segment are organized in an ordered arrangement.

9. The method of claim 1, further comprising:
evaluating digests stored in an index table upon not finding a matching digest in the rapid lookup digest segment; and
based on the evaluation, retrieving a digest segment from the index table, wherein the digest segment is associated with a digest stored in the index table that matches the digest associated with the data block.

10. The method of claim 1, wherein applying the deduplicating technique further comprising:
updating an address mapping of the candidate data object to point to the data object, wherein the candidate data object and the data object contain identical content of data, wherein an address mapping indicates a location of a data object on a disk storage; and
deleting the content of the candidate data object from the disk storage.

11. A system for use in managing deduplication of data in storage systems, the system comprising a processor configured to:
search a rapid lookup digest segment for a digest of a data block, the rapid lookup digest segment including a set of digests associated with a set of data blocks previously received for deduplication;
add the digest of the data block to the rapid lookup digest segment;
identify, in an index table, a digest segment with at least one digest in common with the set of digests of the rapid lookup digest segment, prior to addition of the digest of the data block; and
overwrite the digest segment in the index table with the rapid lookup digest segment, the rapid lookup digest segment being associated with a data object for deduplication.

12. The system of claim 11, wherein a set of data objects resides on a storage extent comprising a set of LUNs, wherein each LUN of the set of LUNs is a logical representation of a subset of a physical disk storage.

13. The system of claim 11, wherein the data object includes the data block, wherein the data block is a fixed size chunk of physical disk storage.

14. The system of claim 11, wherein the digest is based on contents of the data object that uniquely identifies the data object.

15. The system of claim 11, wherein an index table comprises a set of index entries, wherein each index entry of the set of index entries is associated with a digest of a data object that satisfies a sampling criterion, wherein each index entry of the set of index entries includes a digest of the data object and information regarding a digest segment associated with the data object.

16. The system of claim 11, wherein the data object is deduplicated upon receiving a request to write data to the data object.

17. The system of claim 11, wherein the rapid lookup digest segment is stored on a fast access memory.

18. The system of claim 11, wherein the set of digests in the rapid lookup digest segment are organized in an ordered arrangement.

19. The system of claim 11, further comprising:
evaluate digests stored in an index table upon not finding a matching digest in the rapid lookup digest segment; and
based on the evaluation, retrieving a digest segment from the index table, wherein the digest segment is associated with a digest stored in the index table that matches the digest associated with the data block.

20. The system of claim 11, wherein applying the deduplicating technique further comprising:
update an address mapping of the candidate data object to point to the data object, wherein the candidate data object and the data object contain identical content of data, wherein an address mapping indicates a location of a data object on a disk storage; and
delete the content of the candidate data object from the disk storage.

* * * * *